United States Patent
Toda et al.

(10) Patent No.: US 9,534,085 B2
(45) Date of Patent: Jan. 3, 2017

(54) ENE-THIOL-TYPE CURABLE COMPOSITION AND CURED PRODUCT THEREOF

(71) Applicant: SHOWA DENKO K.K., Tokyo (JP)

(72) Inventors: Asuka Toda, Tokyo (JP); Akira Shibuya, Kawasaki (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 14/896,692

(22) PCT Filed: Jun. 11, 2014

(86) PCT No.: PCT/JP2014/065454
§ 371 (c)(1),
(2) Date: Dec. 8, 2015

(87) PCT Pub. No.: WO2014/203779
PCT Pub. Date: Dec. 24, 2014

(65) Prior Publication Data
US 2016/0145392 A1    May 26, 2016

(30) Foreign Application Priority Data

Jun. 17, 2013    (JP) ................. 2013-126951

(51) Int. Cl.
| C08F 2/46 | (2006.01) |
| C08F 2/50 | (2006.01) |
| B29C 71/04 | (2006.01) |
| C08G 61/04 | (2006.01) |
| C08G 75/04 | (2016.01) |

(52) U.S. Cl.
CPC ............. *C08G 75/045* (2013.01); *C08G 75/04* (2013.01)

(58) Field of Classification Search
CPC .................................................. C08G 75/045
USPC ........... 522/42, 33, 6, 71, 189, 184, 1; 520/1
See application file for complete search history.

(56) References Cited

U.S. PATENT DOCUMENTS

| 2005/0119366 A1* | 6/2005 | Moy .................. C08G 18/3876 |
| | | 522/173 |
| 2007/0043205 A1* | 2/2007 | Dias ...................... C08F 283/00 |
| | | 528/373 |
| 2010/0047713 A1* | 2/2010 | Murofushi ............ G03F 7/0275 |
| | | 430/281.1 |
| 2012/0165498 A1 | 6/2012 | Kitano et al. |
| 2014/0079947 A1 | 3/2014 | Tamura et al. |

FOREIGN PATENT DOCUMENTS

| JP | 1-204902 A | 8/1989 |
| JP | 4-146919 A | 5/1992 |
| JP | 5-93069 A | 4/1993 |
| JP | 11-228938 A | 8/1999 |
| JP | 2000-102933 A | 4/2000 |
| JP | 2004-277660 A | 10/2004 |
| JP | 2010-132751 A | 6/2010 |
| JP | 2011-52148 A | 3/2011 |
| WO | 2011/021363 A1 | 2/2011 |
| WO | 2012/128311 a1 | 9/2012 |

OTHER PUBLICATIONS

Charles E. Hoyle et al., "Thiol-Ene Click Chemistry", Angew. Chem. Int. Ed., 2010, pp. 1540-1573, vol. 49.
International Search Report for PCT/JP2014/065454 dated Sep. 9, 2014.

* cited by examiner

*Primary Examiner* — Ling Choi
*Assistant Examiner* — Jessica E Whiteley
(74) *Attorney, Agent, or Firm* — Sughrue Mion, PLLC

(57) ABSTRACT

An ene-thiol based curable composition according to the present invention includes:
(A) a thiol compound having two or more groups represented by a following general formula (1) in the molecule; and
(B) an ene oligomer having an alicyclic or aromatic ring structure and two or more ethylenically unsaturated groups in the molecule, with a number average molecular weight of 500 to 20,000 in terms of polystyrene.
In the following general formula (1), each of $R^1$ and $R^2$ independently represents a hydrogen atom, an alkyl group having 1 to 10 carbon atoms, or an aromatic group having 6 to 10 carbon atoms; a is an integer of 0 to 2; and b is 0 or 1.

[Chemical Formula 1]

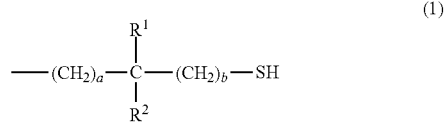

(1)

10 Claims, No Drawings

ENE-THIOL-TYPE CURABLE COMPOSITION AND CURED PRODUCT THEREOF

TECHNICAL FIELD

The present invention relates to an ene-thiol based curable composition and a cured product thereof.

Priority is claimed on Japanese Patent Application No. 2013-126951, filed Jun. 17, 2013, the content of which is incorporated herein by reference.

BACKGROUND ART

A reaction of a thiol compound and a compound having a carbon-carbon double bond is known as a thiol-ene reaction, and an academic review has been reported in Non-Patent Document 1.

In the thiol-ene reaction, since a (meth)allyl compound and a thiol compound react in a functional group molar ratio of about one-to-one (1:1) to generate a thioether bond, a cured product with homogeneous functionality is achieved.

In addition, it has been known to be less susceptible to oxygen inhibition, and attention has been given to its excellent productivity as well as high flexibility and transparency.

In Patent Document 1, a thermosetting composition utilizing a thiol-ene reaction by a thermal polymerization initiator has been disclosed, and the suitability possibilities in the fields of coating agents such as coating materials, binders, adhesives, inks and the like have been described. In Patent Document 1, a thiol-ene cured product using a copolymer compound of (meth)acrylate compound and a primary thiol compound has been described. However, with the (meth)acrylate compound, since a homogeneous composition is not obtained because the homopolymerization of (meth)acrylic group per se is allowed to proceed with the thiol-ene reaction, elasticity and flexibility of the cured product may be insufficient.

In addition, in Patent Document 2, a photocurable resin composition for a lens sheet has been described, and a technique with regard to a thiol-ene cured product composed by a (meth)allyl compound and a primary thiol compound has been disclosed. However, an allyl compound having a molecular weight of not more than 300 has been used in the examples, and a thiol-ene cured product obtained by an ene oligomer having a large molecular weight has not been disclosed.

When using such ene compounds, it has been difficult to produce a cured product that can achieve all of sufficient flexibility, storage stability, solvent resistance, fracture resistance, elongation, and adhesion.

CITATION LIST

Patent Documents

[Patent Document 1] Japanese Unexamined Patent Application, First Publication No. 2004-277660
[Patent Document 2] Japanese Unexamined Patent Application, First Publication No. 2000-102933

Non-Patent Document

[Non-Patent Document 1] Charles E. Hoyle and Christopher N. Bowman, Angew. Chem. Int. Ed. (2010) Vol. 49, pp. 1540-1573.

SUMMARY OF INVENTION

Technical Problem

The present invention has an object to provide a thiol-ene curable resin composition that is able to form a cured product with excellent flexibility, fracture resistance, and solvent resistance, by selecting a specific ene compound and a thiol compound.

Solution to Problem

The inventors of the present invention have found that a cured product functionally superior to the conventionally known thiol-ene reaction products can be provided by using an ene oligomer having an alicyclic or aromatic ring structure and two or more ethylenically unsaturated groups in the molecule with a number average molecular weight in terms of polystyrene of 500 to 20,000, as an ene compound to be used in the thiol-ene reaction. This has led to the completion of the present invention.

In other words, the present invention relates to the following ene-thiol based curable composition and the cured product thereof.

[1] An ene-thiol based curable composition characterized by including: (A) a thiol compound having two or more groups represented by the following general formula (1) in the molecule; and (B) an ene oligomer having an alicyclic or aromatic ring structure and two or more ethylenically unsaturated groups in the molecule, with a number average molecular weight of 500 to 20,000 in terms of polystyrene.

[Chemical Formula 1]

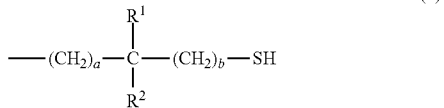

(1)

[In the general formula (1), each of $R^1$ and $R^2$ independently represents a hydrogen atom, an alkyl group having 1 to 10 carbon atoms, or an aromatic group having 6 to 10 carbon atoms, a is an integer of 0 to 2, and b is 0 or 1.]

[2] The ene-thiol based curable composition according to the above [1], in which the aforementioned ene oligomer (B) is a reaction product of a compound (B-1) having an alicyclic or aromatic ring and two or more ethylenically unsaturated groups in the molecule and a polyhydric alcohol (B-2).

[3] The ene-thiol based curable composition according to the above [1] or [2], in which the aforementioned ene oligomer (B) is any one or more of the oligomers represented by the following general formulae (2) to (4).

[Chemical Formula 2]

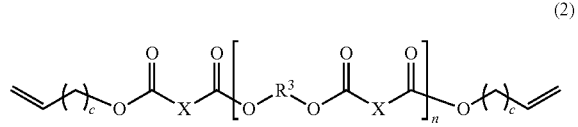

(2)

[In the general formula (2), c is an integer of 0 to 5, $R^3$ is an alkylene group having 1 to 10 carbon atoms in the main chain which may have an alkyl group of 1 to 5 carbon atoms as a substituent, and which may have an ether linkage inserted therewithin, X is a phenylene group or a cyclohexene group which may have an alkyl group of 1 to 4 carbon atoms as a substituent, and n is an integer of 3 to 20.]

[Chemical Formula 3]

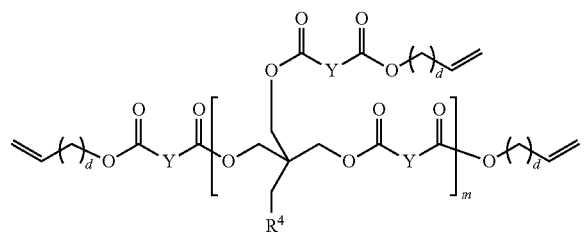

(3)

[In the general formula (3), d is the same as c described above, $R^4$ is an alkyl group of 1 to 4 carbon atoms or a group represented by the following formula (3'), Y is the same as X described above, and m is an integer of 3 to 70.]

[Chemical Formula 4]

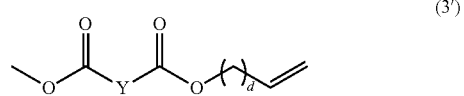

(3')

[In the general formula (3'), d and Y are the same as described above in the general formula (3).]

[Chemical Formula 5]

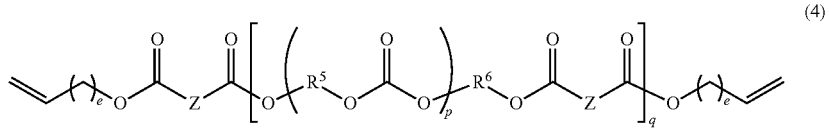

(4)

[In the general formula (4), e is the same as c described above, each of $R^5$ and $R^6$ independently represents an alkylene group having 1 to 10 carbon atoms in the main chain which may have an alkyl group of 1 to 5 carbon atoms as a substituent, Z is the same as X described above, p is an integer of 1 to 10, and q is an integer of 5 to 50.]

[4] The ene-thiol based curable composition according to any one of the above [1] to [3], in which b is 0 in the aforementioned thiol compound (A).

[5] The ene-thiol based curable composition according to any one of the above [1] to [4], in which the aforementioned thiol compound (A) is a thiol compound (A1) having two or more groups represented by the general formula (1) in the molecule and having no hydroxyl group in the molecule.

[6] The ene-thiol based curable composition according to any one of the above [1] to [4], in which the aforementioned thiol compound (A) includes both of a thiol compound (A1) having two or more groups represented by the aforementioned general formula (1) in the molecule and having no hydroxyl group in the molecule, and a thiol compound (A2) having two or more groups represented by the aforementioned general formula (1) in the molecule and having a hydroxyl group in the molecule.

[7] The ene-thiol based curable composition according to the above [6], in which the aforementioned thiol compound (A2) accounts for from 0 to 30% by mass of the aforementioned thiol compound (A).

[8] The ene-thiol based curable composition according to any one of the above [5] to [7], in which the aforementioned thiol compound (A1) is pentaerythritol tetrakis(3-mercaptobutyrate).

[9] The ene-thiol based curable composition according to any one of the above [6] to [8], in which the aforementioned thiol compound (A2) is pentaerythritol tris(3-mercaptobutyrate).

[10] The ene-thiol based curable composition according to any one of the above [1] to [9], in which the aforementioned thiol compound (A) and the aforementioned ene oligomer (B) are included in such a manner that the ethylenically unsaturated group in the aforementioned ene oligomer (B) is contained at a ratio of 0.5 to 10 mol relative to 1 mol of a mercapto group in the aforementioned thiol compound (A).

[11] The ene-thiol based curable composition according to any one of the above [1] to [10], further containing a photopolymerization initiator and/or a thermal polymerization initiator.

[12] A cured product characterized by being formed by curing the ene-thiol based curable composition according to any one of the above [1] to [11].

Advantageous Effects of Invention

By using an ene oligomer having an alicyclic or aromatic ring structure and two or more ethylenically unsaturated groups in the molecule, with a number average molecular weight of 500 to 20000 in terms of polystyrene, as described in the present invention, it becomes possible to produce a cured product functionally superior than thiol-ene reaction products that do not contain this oligomer.

DESCRIPTION OF EMBODIMENTS

A preferred example of the present invention will be described below, although the present invention is not limited to these examples. Additions, omissions and substitutions of configurations as well as other modifications can be made without departing from the spirit or scope of the present invention.

<Thiol Compound (A)>

The ene-thiol based curable composition of the present invention includes a thiol compound (A) and an ene oligomer (B).

The thiol compound (A) used in the present invention is a compound having two or more groups represented by the general formula (1).

[Chemical Formula 6]

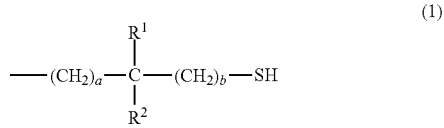
(1)

In the above general formula (1), each of $R^1$ and $R^2$ independently represents a hydrogen atom, an alkyl group having 1 to 10 carbon atoms or an aromatic group having 6 to 10 carbon atoms.

The alkyl group having 1 to 10 carbon atoms represented by $R^1$ and $R^2$ may be either linear or branched. Examples thereof include a methyl group, an ethyl group, an n-propyl group, an iso-propyl group, an n-butyl group, an iso-butyl group, a tert-butyl group, an n-hexyl group, an n-octyl group, and the like, and a methyl group and an ethyl group are preferred.

As the aromatic group having 6 to 10 carbon atoms represented by $R^1$ and $R^2$, a phenyl group, a toluyl group, a xylyl group, an ethylphenyl group, a 1,3,5-trimethylphenyl group, a naphthyl group or the like can be mentioned.

a represents an integer of 0 to 2, and 0 or 1 is preferred. b represents 0 or 1.

As the thiol compound used in the present invention, from the viewpoints of reactivity and thermal yellowing resistance, it is preferably a compound in which b is 0 and at least one of $R^1$ and $R^2$ represents an alkyl group of 1 to 10 carbon atoms or an aromatic group of 6 to 10 carbon atoms, in other words, a secondary or tertiary thiol. Furthermore, secondary thiol compounds in which b is 0 and one of $R^1$ and $R^2$ is a hydrogen atom while the other is an alkyl group having 1 to 10 carbon atoms are more preferred.

As the group represented by the general formula (1), a group represented by the following general formula (1a) is preferred.

[Chemical Formula 7]

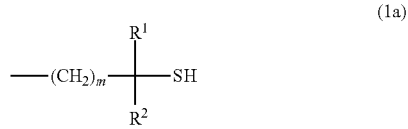
(1a)

In the above general formula (1a), $R^1$ and $R^2$ are the same as defined in the above general formula (1), and m represents an integer of 0 to 2.

Examples of the thiol compound (A) used in the present invention include ester compounds of mercapto group-containing carboxylic acids represented by the following general formula (1b) and polyhydric alcohols.

[Chemical Formula 8]

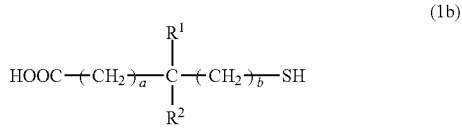
(1b)

In the above general formula (1b), $R^1$, $R^2$, a and b are the same as defined in the above general formula (1).

Among the various possibilities, as the thiol compound (A) used in the present invention, an ester compound of a mercapto group-containing carboxylic acid represented by the following general formula (1c) and a polyhydric alcohol is preferred from the viewpoints of the raw material availability, the reactivity with the double bond compounds, the composition stability, the physical properties of the cured product, and the like.

[Chemical Formula 9]

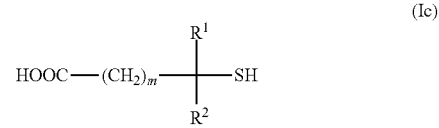
(1c)

In the above general formula (1c), $R^1$, $R^2$ and m are the same as defined in the above general formula (1a).

Specific examples of the mercapto group-containing carboxylic acids include compounds represented by the following formulae (1c-1) to (1c-2).

[Chemical Formula 10]

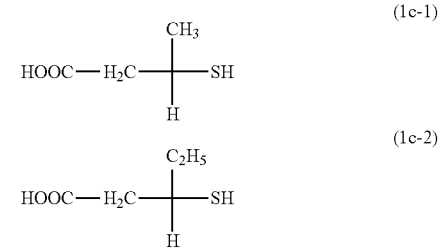

A polyhydric alcohol refers to a compound having two or more hydroxyl groups.

Specific examples of the polyhydric alcohols include aliphatic glycols of 2 to 10 carbon atoms which may be branched, such as 1,4-butanediol, diethylene glycol, and dipropylene glycol, glycerol, trimethylolpropane, pentaerythritol, dipentaerythritol, cyclohexanediol, cyclohexanedimethanol, norbornene dimethanol, 2,2-bis[4-(2-hydroxyethyloxy)phenyl]propane, hydrogenated bisphenol A, 4,4'-(9-fluorenylidene)bis(2-phenoxyethanol) and tris(2-hydroxyethyl) isocyanurate.

The polyhydric alcohol is preferably a divalent to tetravalent alcohol, and 1,4-butanediol, tris(2-hydroxyethyl)isocyanurate, pentaerythritol, and trimethylolpropane are more preferred.

The thiol compound (A) used in the present invention is preferably a thiol compound (A1) having two or more groups represented by the general formula (1) in the molecule, and having no hydroxyl group in the molecule.

As the thiol compound (A1), a compound represented by the following formula (1-2) is preferred.

[Chemical Formula 11]

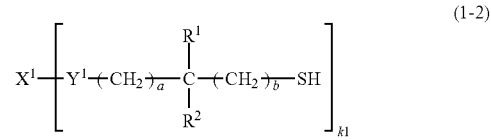
(1-2)

In the above general formula (1-2), $R^1$, $R^2$, a and b are the same as defined in the above general formula (1).

$X^1$ represents an aliphatic group, a group containing an aromatic ring or a group containing a heterocyclic ring, in a polyhydric alcohol, and is a group having a valency of k1. It should be noted that the aliphatic group includes linear and cyclic groups.

k1 represents an integer of 1 to 20, and is preferably an integer of 2 to 20, more preferably an integer of 2 to 15, and particularly preferably an integer of 2 to 6.

$Y^1$ is an ester bond represented by —OCO—.

The number average molecular weight of the thiol compound (A1) is preferably from 150 to 10,000, more preferably from 170 to 2,000, and particularly preferably from 200 to 1,000.

Examples of $X^1$ include groups obtained by removing k1 hydroxyl groups from a polyfunctional alcohol such as alkylene glycols having an alkylene group of 2 to 10 carbon atoms which may be branched, diethylene glycol, dipropylene glycol, glycerol, trimethylolpropane, pentaerythritol, dipentaerythritol, cyclohexanediol, cyclohexanedimethanol, norbornene dimethanol, tricyclodecane dimethanol, 1,3,5-trihydroxy-3-methylpentane, tris-2-hydroxy isocyanurate, tris(2-hydroxyethyl) isocyanurate, bisphenol A, EO-modified bisphenol A, hydrogenated bisphenol A, 2,2'-(4-(2-hydroxyethyl)phenyl)propane, 4,4'-(9-fluorenylidene)bis(2-phenoxyethanol), polyglycerol polyols, polycarbonate diols, hydroxy-terminated polysilicones, and polyols containing an aromatic ring.

Specific examples of the thiol compound (A1) used in the present invention include ethylene glycol bis(3-mercaptobutyrate), 1,2-propylene glycol (3-mercaptobutyrate), trimethylolpropane tris(3-mercaptobutyrate), ethylene glycol bis(2-mercaptoisobutyrate), 1,2-propylene glycol bis(2-mercaptoisobutyrate) or trimethylolpropane tris(2-mercaptoisobutyrate), pentaerythritol tetrakis(3-mercaptobutyrate), 1,3,5-tris(3-mercaptobutyloxyethyl)-1,3,5-triazine-2,4,6(1H, 3H, 5H)-trione, 1,4-bis(3-mercaptobutyryloxy) butane, bisphenol A bis(3-mercaptobutyrate), and triphenol methane tris(3-mercaptobutyrate), although the thiol compound used in the present invention is not limited to these.

For reasons such as easy curing with less added amount and a large effect on yellowing resistance obtained by the present invention, pentaerythritol tetrakis(3-mercaptobutyrate) represented by the following formula (1-2-1), 1,3,5-tris(3-mercaptobutyloxyethyl)-1,3,5-triazine-2,4,6(1H, 3H, 5H)-trione, and 1,4-bis(3-mercaptobutyryloxy) butane can be preferably used.

[Chemical Formula 12]

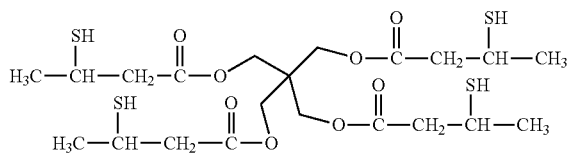

(1-2-1)

In addition, the thiol compound (A) used in the present invention preferably includes both the thiol compound (A1) having two or more groups represented by the aforementioned general formula (1) in the molecule and having no hydroxyl group in the molecule and the thiol compound (A2) having two or more groups represented by the aforementioned general formula (1) in the molecule and having a hydroxyl group in the molecule.

The thiol compound (A2) is an ester compound of a mercapto group-containing carboxylic acid represented by the aforementioned general formula (1b) and the aforementioned polyhydric alcohol, and it is preferably a compound in which one or more hydroxyl groups of the polyhydric alcohol are remaining without reacting with a carboxylic acid, for example, a compound represented by the following general formula (1-3).

[Chemical Formula 13]

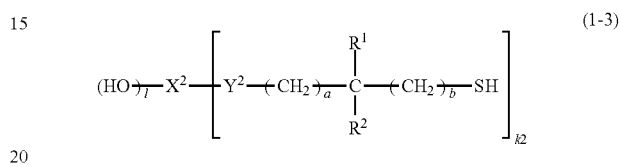

(1-3)

In the above general formula (1-3), $R^1$, $R^2$, a and b are the same as defined in the above general formula (1).

$X^2$ represents an aliphatic group, a group containing an aromatic ring or a group containing a heterocyclic ring, in the above polyhydric alcohol, and is a group having a valency of (1+k2). It should be noted that the aliphatic group includes linear and cyclic groups.

(1+k2) represents an integer of 1 to 20, and is preferably an integer of 2 to 20, more preferably an integer of 2 to 15, and particularly preferably an integer of 2 to 6.

$Y^2$ is an ester bond represented by —OCO—.

The number average molecular weight of the thiol compound (A2) is preferably from 150 to 10,000, more preferably from 170 to 2,000, and particularly preferably from 200 to 1,000.

Examples of $X^2$ include groups obtained by removing k2 hydroxyl groups from a polyfunctional alcohol such as alkylene glycols having an alkylene group of 2 to 10 carbon atoms which may be branched, diethylene glycol, dipropylene glycol, glycerol, trimethylolpropane, pentaerythritol, dipentaerythritol, cyclohexanediol, cyclohexanedimethanol, norbornene dimethanol, tricyclodecane dimethanol, 1,3,5-trihydroxy-3-methylpentane, tris-2-hydroxy isocyanurate, tris(2-hydroxyethyl) isocyanurate, bisphenol A, EO-modified bisphenol A, hydrogenated bisphenol A, 2,2'-(4-(2-hydroxyethyl)phenyl)propane, 4,4'-(9-fluorenylidene)bis(2-phenoxyethanol), polyglycerol polyols, polycarbonate diols, hydroxy-terminated polysilicones, and polyols containing an aromatic ring.

Among them, as the compound (A2), pentaerythritol tris(3-mercaptobutyrate) represented by the following formula (1-3-1) is preferred.

[Chemical Formula 14]

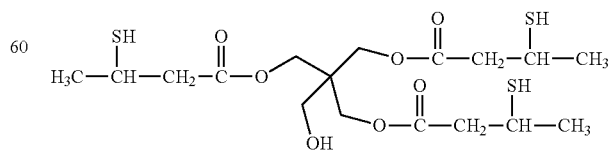

(1-3-1)

From the viewpoint of achieving more excellent solvent resistance, it is preferable that from 0.1 to 30% by mass of the 100% by mass of the thiol compound (A) is the aforementioned thiol compound (A2), and it is more preferable that from 0.1 to 20% by mass is the aforementioned thiol compound (A2).

The thiol compound (A) used in the present invention can also be obtained easily as commercially available products.

The thiol compounds that can be obtained as commercially available products include 1,4-bis(3-mercaptobutyryloxy) butane (trade name: Karenz MT BD1, manufactured by Showa Denko K.K., registered trademark), a mixture of pentaerythritol tetrakis(3-mercaptobutyrate) and pentaerythritol tris(3-mercaptobutyrate) (trade name: Karenz MT PE1, manufactured by Showa Denko K.K., registered trademark), 1,3,5-tris(3-mercaptobutyloxyethyl)-1,3,5-triazine-2,4,6 (1H, 3H, 5H)-trione (trade name: Karenz MTNR1, manufactured by Showa Denko K.K., registered trademark), and the like.

<Ene Oligomer (B)>

The ene oligomer (B) used in the present invention is an oligomer having an alicyclic or aromatic ring structure and two or more ethylenically unsaturated groups in the molecule, with a number average molecular weight of 500 to 20,000 (in terms of polystyrene). The expression "in terms of polystyrene" refers to a number average molecular weight which is expressed as the molecular weight in terms of the polystyrene used as a molecular weight standard, as measured by gel permeation chromatography (GPC).

It is preferable that the aforementioned ethylenically unsaturated group is an allyl group, and the aforementioned number average molecular weight is more preferably from 500 to 18,000, and most preferably from 500 to 15,000.

The ene oligomer is still more preferably any one or more of the oligomers represented by the general formulae (2) to (4).

[Chemical Formula 15]

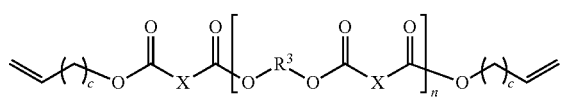

(2)

In the above general formula (2), c is an integer of 0 to 5, preferably from 1 to 3, and most preferably 1. In other words, the case where the end of the oligomer is an allyl group is most preferred. $R^3$ is an alkylene group having 1 to 10 (preferably from 1 to 6 and more preferably from 2 to 6) carbon atoms in the main chain which may have an alkyl group of 1 to 5 (preferably from 1 to 3, and more preferably 1) carbon atoms as a substituent, and which may have an ether bond inserted therewithin.

Specific examples of the main chain of $R^3$ include —$CH_2$—, —$(CH_2)_2$—, —$(CH_2)_3$—, —$(CH_2)_4$—, —$(CH_2)_5$—, —$(CH_2)_6$—, —$CH_2$—O—$CH_2$—, —$(CH_2)_2$—O—$CH_2$—, —$(CH_2)_2$—O—$(CH_2)_2$—, —$(CH_2)_3$—O—$CH_2$—, —$(CH_2)_3$—O—$(CH_2)_2$—, —$(CH_2)_3$—O—$(CH_2)_3$—, —$CH_2$—O—$CH_2$—O—$CH_2$—, —$(CH_2)_2$—O—$CH_2$—O—$CH_2$—, —$(CH_2)_2$—O—$(CH_2)_2$—O—$CH_2$—, —$(CH_2)_2$—O—$(CH_2)_2$—O—$(CH_2)_2$—, and —$(CH_2)_2$—O—$CH_2$—O—$(CH_2)_2$—, and any one of these hydrogen atoms may be optionally substituted by an alkyl group of 1 to 5 carbon atoms. Among them, —$CH_2(CH_3)$—$(CH_2)$— and —$(CH_2)_2$—O—$(CH_2)_2$— are preferred.

X is a phenylene group or a cyclohexene group which may have an alkyl group of 1 to 4 carbon atoms as a substituent, and is preferably a phenylene group or a cyclohexylene group which has no substituent.

Specific examples of the aforementioned alkyl group of 1 to 4 carbon atoms include a methyl group, an ethyl group, a propyl group, an isopropyl group, an n-butyl group, a sec-butyl group, an isobutyl group, and a tert-butyl group.

The position to which the aforementioned phenylene or cyclohexylene is bonded to the adjacent carbonyl carbon may be any of the 1,2-position, the 1,3-position and the 1,4-position, but is preferably the 1,4-position.

n is an integer of 3 to 20, preferably from 4 to 18, and more preferably from 5 to 15.

The number average molecular weight of the compound (2) is preferably from about 500 to 10,000, more preferably from 500 to 9,000, and most preferably from 500 to 8,000.

In the case where the units in parentheses of the general formula (2) are repeated n times, $R^3$ and X in parentheses may be different or may be the same, but are preferably the same.

Specific examples of the compound represented by the general formula (2) include the compounds represented by the following general formulae (2-1) to (2-2).

[Chemical Formula 16]

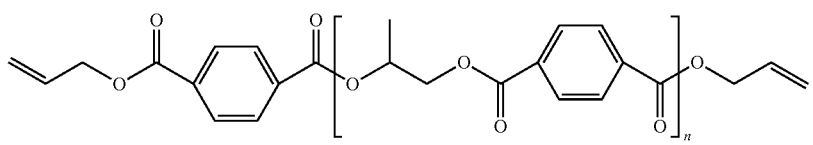

(2-1)

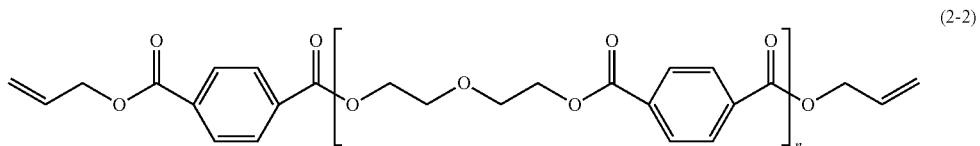

(2-2)

In the above general formulae (2-1) to (2-2), n is the same as in the general formula (2).

[Chemical Formula 17]

(3)

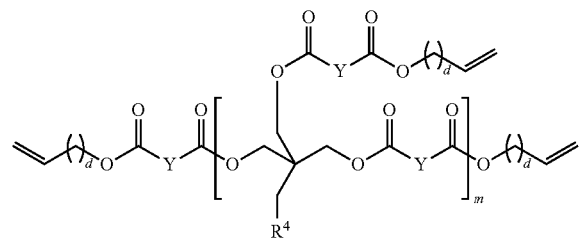

In the above general formula (3), d is the same as c described above, and Y is the same as X described above. $R^4$ is an alkyl group having 1 to 4 carbon atoms (specific examples thereof are the same as the specific examples of alkyl groups of 1 to 4 carbon atoms as the substituents represented by X described above) or a group represented by the following formula (3').

[Chemical Formula 18]

(3')

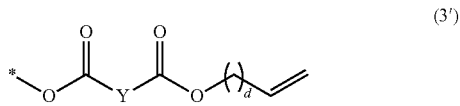

The location indicated by an asterisk (*) in the above formula (3') corresponds to the position of the carbon atom adjacent to a quaternary carbon in the general formula (3).

In the above general formula (3'), d and Y are the same as in the general formula (3).

m is an integer of 3 to 70, preferably from 4 to 60, and more preferably from 4 to 50. The number average molecular weight of the compound (3) is preferably from about 500 to 20,000, more preferably from 800 to 18,000, and most preferably from 1,000 to 16,000.

In the case where the units in parentheses of the general formula (3) are repeated m times, $R^4$, d and Y in parentheses may be different or may be the same, but are preferably the same.

Specific examples of the compound represented by the general formula (3) include the compounds represented by the following general formulae (3-1) to (3-2).

[Chemical Formula 19]

(3-1)

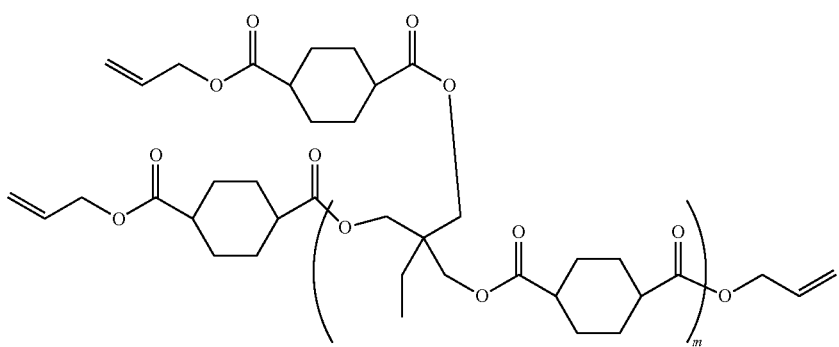

(3-2)

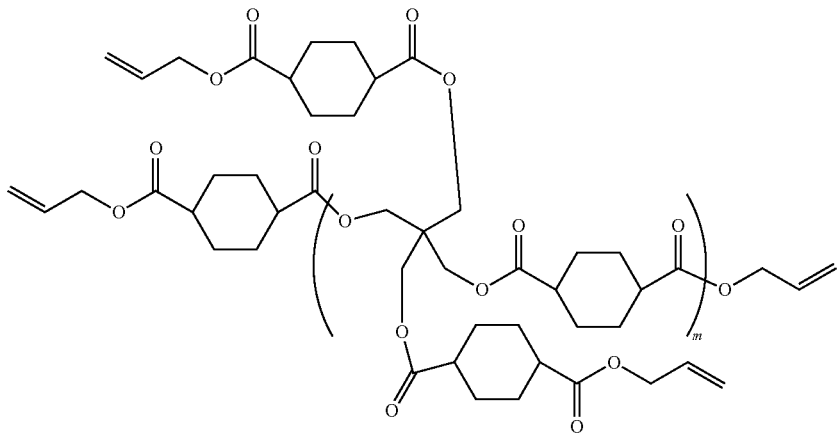

In the above general formulae (3-1) to (3-2), m is the same as in the general formula (3).

[Chemical Formula 20]

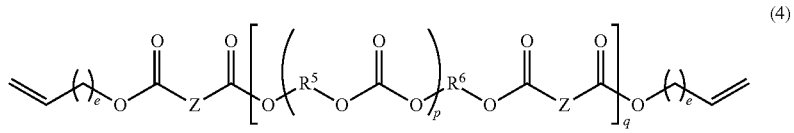

(4)

In the above general formula (4), e is the same as c, and each of $R^5$ and $R^6$ independently represents an alkylene group having 1 to 10 (preferably from 3 to 9 and more preferably from 4 to 7) carbon atoms in the main chain which may have an alkyl group of 1 to 5 (preferably from 1 to 3 and more preferably 1) carbon atoms as a substituent. n is from 1 to 1,500, preferably from 1 to 1,000, and more preferably from 1 to 500. Similarly, m is from 1 to 1,700, preferably from 1 to 330, and more preferably from 1 to 180.

Z is the same as X described above. p is from 1 to 1,500, preferably from 1 to 1,000, and more preferably from 1 to 500. Similarly, q is from 1 to 1,700, preferably from 1 to 330, and more preferably from 1 to 180.

The number average molecular weight of the compound (4) is preferably from about 500 to 20,000, more preferably from 1,000 to 10,000, and most preferably from 1,500 to 5,000.

Specific examples of the compound represented by the general formula (4) include the compounds represented by the following formula (4-1).

[Chemical Formula 21]

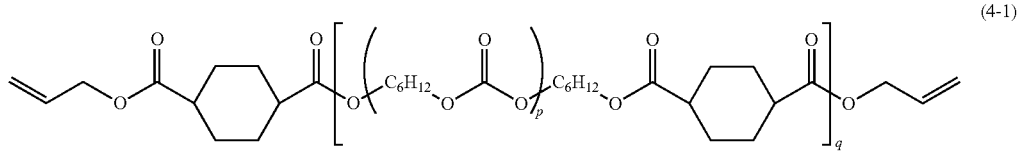

(4-1)

In the above general formula (4-1), p and q are the same as in the formula (4).

The compounds corresponding to those in the general formulae (2) to (4) are preferably reaction products (and in particular, esterification reaction products) of a compound (B-1) having an alicyclic or aromatic ring and two or more ethylenically unsaturated groups in the molecule, and a polyhydric alcohol (B-2).

The method for producing an oligomer having the above structures of (2) to (4) is not particularly limited. It is preferably an oligomer which is prepared by the method described in Japanese Unexamined Patent Application, First Publication No. 2010-132751.

The polyhydric alcohol (B-2) refers to a compound having two or more hydroxyl groups in the molecule, and is preferably a compound having 2 to 4 hydroxyl groups in the molecule. Specific examples include divalent to tetravalent alcohols such as ethanediol, propanediol, diethylene glycol, triethylene glycol, tetraethylene glycol, pentaerythritol, trimethylolpropane, and trimethylolethane.

The compound (B-1) having an alicyclic or aromatic ring and two or more ethylenically unsaturated groups in the molecule is preferably a compound having a dicarboxylic acid or a diester.

Specific examples include diallyl benzene dicarboxylate, divinyl benzene dicarboxylate, diallyl cyclohexane dicarboxylate, and divinyl cyclohexane dicarboxylate. Among them, diallyl benzene dicarboxylate or diallyl cyclohexane dicarboxylate is preferred, and in particular, terephthalic acid or diallyl 1,4-cyclohexanedicarboxylate is more preferred.

The method for synthesizing the ene oligomer compounds used in the present invention is not particularly limited. For example, they can be synthesized by the method as described in Japanese Unexamined Patent Application, First Publication No. Hei 4-146919. The molecular weight of the ene oligomer compound to be used is preferably in the ranges of 500 to 30,000 expressed as the number average molecular weight (Mn) in terms of polystyrene measured by the GPC (gel permeation chromatography) method, and 1,000 to 100,000 expressed as the weight average molecular weight (Mw), respectively. The ene oligomer compounds may contain raw material monomers having a low molecular weight, but can be used as they are without separation.

<Other Additives>

The ene-thiol based curable composition of the present invention may contain a radical polymerization initiator.

The radical polymerization initiator in the present invention refers to one that generates a radical due to heat, light, a redox reaction, or the like. That is, the ene-thiol based curable composition of the present invention preferably further contains a photopolymerization initiator and/or a thermal polymerization initiator.

Examples of such initiators include organic peroxides, azo compounds, redox initiators, and the like.

Examples of the organic peroxides include benzoyl peroxide, cumene hydroperoxide, di-tert-butyl peroxide, tert-butyl hydroperoxide and dicumyl peroxide.

Specific examples of the azo compound include 2,2'-azobispropane, 2,2'-dichloro-2,2'-azobispropane, 1,1'-azo (methylethyl) diacetate, 2,2'-azobisisobutane, 2,2'-azobisisobutylamide, 2,2'-azobisisobutyronitrile (AIBN), 2,2'-azobis-2-methyl methylpropionate, 2,2'-dichloro-2,2'-azobisbutane, 2,2'-azobis-2-methylbutyronitrile, 2,2'-dimethyl azobisisobutyrate, 3,5-dihydroxymethylphenylazo-2-methylmalonodinitrile, 2,2'-azobis-2-methylvaleronitrile, 4,4'-azobis-4-dimethyl cyanovaleric acid, and 2,2'-azobis-2,4-dimethylvaleronitrile.

As the redox initiator, for example, combinations of hydrogen peroxide-iron (II) salt, organic peroxide-dimethylaniline, cerium (IV) salt-alcohol, and the like can be mentioned.

Examples of the photopolymerization initiator include known photopolymerization initiators such as alkylphenone-based photopolymerization initiators, α-aminoalkyl ketone-based photopolymerization initiators, and phosphine oxide-based photopolymerization initiators.

More specifically, as the alkylphenone-based photopolymerization initiator, 1-hydroxycyclohexyl phenyl ketone, 2,2-dimethoxy-1,2-diphenylethan-1-one, 2-hydroxy-2-methyl-1-phenylpropan-1-one, 1-[4-(2-hydroxyethoxy)-phenyl]-2-hydroxy-2-methyl-1-propan-1-one, 2-hydroxy-1-{4-[4-(2-hydroxy-2-methylpropionyl)benzyl]phenyl}-2-methylpropan-1-one, and the like can be mentioned.

Examples of the α-aminoalkyl ketone-based photopolymerization initiators include 2-methyl-1-[4-(methylthio) phenyl]-2-morpholinopropan-1-one, 2-benzyl-2-dimethyl-amino-1-(4-morpholinophenyl)-1-butanone, 2-dimethylamino-2-(4-methylbenzyl)-1-(4-morpholin-4-yl-phenyl) butan-1-one, and the like.

Examples of the phosphine oxide-based photopolymerization initiators include bis(2,4,6-trimethylbenzoyl) phenyl phosphine oxide, bis(2,6-dimethoxybenzoyl)-2,4,4-trimethylpentyl phosphine oxide, 2,4,6-trimethylbenzoyl-diphenyl phosphine oxide, and the like. In addition, two or more types of these photopolymerization initiators may be added as a mixture.

As other initiators, dialkyl disulfides such as tetraalkyl thiuram disulfide in which the S—S bonds are easily decomposed by heat can also be used.

The amount of the radical polymerization initiator used is, with respect to a total of 100 parts by mass of the ene oligomer (B) and the thiol compound (A), preferably from 0.001 to 10 parts by mass, more preferably from 0.005 to 5 parts by mass, and still more preferably from 0.01 to 3 parts by mass.

If the amount of the radical polymerization initiator used is less than 0.001 part by mass, sufficient curability may not be obtained, whereas if the amount exceeds 10 parts by mass, the reactivity of the composition increases too much and the storage stability of the composition becomes insufficient. As a result, the lowering of the surface smoothness at the time of curing and the yellowing of the cured product are promoted in some cases which is undesirable in terms of handling properties and physical properties.

A polymerization inhibitor or a pH adjusting agent may be added to the ene-thiol based curable composition of the present invention, if necessary, in order to improve the storage stability as a composition.

Examples of the polymerization inhibitor include 4-methoxy-1-naphthol, 1,4-dimethoxynaphthalene, 1,4-dihydroxynaphthalene, 4-methoxy-2-methyl-1-naphthol, 4-methoxy-3-methyl-1-naphthol, 1,4-dimethoxy-2-methyl-naphthalene, 1,2-dihydroxynaphthalene, 1,2-dihydroxy-4-methoxynaphthalene, 1,3-dihydroxy-4-methoxynaphthalene, 1,4-dihydroxy-2-methoxynaphthalene, 1,4-dimethoxy-2-naphthol, 1,4-dihydroxy-2-methylnaphthalene, pyrogallol, methyl hydroquinone, tertiary butyl hydroquinone, 4-methoxyphenol, N-nitroso-N-phenyl hydroxyamine aluminum, and the like.

The ene-thiol based curable composition of the present invention can contain, if necessary, (a) a thermoplastic resin; (b) a deodorizer; (c) an adhesion improving agent such as a silane coupling agent and a titanium coupling agent; (d) an antioxidant such as hindered amines, hydroquinones, and hindered phenols; (e) a UV absorber such as benzophenones, benzotriazoles, salicylic acid esters, and metal complex salts; (f) a stabilizer such as metal soaps, inorganic and organic salts of heavy metals (for example, zinc, tin, lead, cadmium, and the like), and organic tin compounds; (g) a pH adjusting agent such as aliphatic carboxylic acids including acetic acid, acrylic acid, palmitic acid, oleic acid, and mercapto carboxylic acids, and aromatic organic acids including phenols, naphthols, benzoic acid, and salicylic acid; (h) a plasticizer such as phthalate esters, phosphate esters, fatty acid esters, epoxidized soybean oil, castor oil, and liquid paraffin alkyl polycyclic aromatic hydrocarbons; (i) waxes such as a paraffin wax, microcrystalline wax, polymerized wax, beeswax, whale wax, and low molecular weight polyolefins; (j) a non-reactive diluent such as benzyl alcohol, tar, and bitumen; (k) a filler such as calcium carbonate, kaolin, talc, mica, bentonite, clay, sericite, glass fiber, carbon fiber, aramid fiber, nylon fiber, acrylic fiber, glass powder, glass balloons, silas balloons, coal powder, acrylic resin powder, phenolic resin powder, metal powder, ceramic powder, zeolite, and slate powder; (l) a pigment or a dye such as carbon black, titanium oxide, red iron oxide, para red, and Prussian blue; (m) a solvent such as ethyl acetate, toluene, alcohols, ethers, and ketones; (n) a blowing agent; (o) a dehydrating agent such as a silane coupling agent, a monoisocyanate compound, and a carbodiimide compound; (p) an antistatic agent; (q) an antibacterial agent; (r) a fungicide; (s) a viscosity adjusting agent; (t) a perfume; (u) a flame retardant; (v) a leveling agent; (w) a sensitizer; (x) a dispersant, and the like. One type of these can be used alone or two or more types thereof can be used in combination at any ratio.

<Added Amount>

The added amounts of the thiol compound (A), the ene oligomer (B), and the radical polymerization initiator in the ene-thiol based curable composition of the present invention are not particularly limited, and can be appropriately determined in accordance with the application.

The amount of the ene oligomer (B) used is, with respect to 1 mol of the mercapto group of the thiol compound (A), preferably an amount such that the ethylenically unsaturated group is from 0.5 to 10 mol, more preferably an amount such that the ethylenically unsaturated group is from 0.7 to 8 mol, and still more preferably an amount such that the ethylenically unsaturated group is from 1 to 5 mol.

Although ene oligomer compounds are essential in the ene compound to be reacted with a thiol compound, ene monomers may be included, and in the case of using the ene monomers in combination, it may suffice that out of the number of moles of the double bond functional group used, at least 5 mol % of ene oligomer compounds are included. Examples of the ene oligomer compounds used in combination include allyl compounds such as diallyl phthalate, diallyl isophthalate, diallyl terephthalate, diallyl esters obtained by subjecting aromatic rings of these to a hydrogenation treatment, and aliphatic allyl ethers such as trimethylolpropane triallyl ether, pentaerythritol tetraallyl ether, pentaerythritol triallyl ether, and triallyl isocyanurate. (Meth)acrylate monomers and (meth)acrylate oligomers may also be used in combination.

<Preparation Method>

A method for preparing the ene-thiol based curable composition of the present invention is not particularly limited as long as it is a method capable of mixing and dispersing the aforementioned components, and examples thereof include the following methods.

(A) Each component is kneaded in a suitable container such as a glass beaker, a can, a plastic cup, and an aluminum cup, by a stirring rod, a spatula, or the like.

(B) Each component is kneaded by a double helical ribbon blade, a gate blade, or the like.

(C) Each component is kneaded by a planetary mixer.

(D) Each component is kneaded by a bead mill.

(E) Each component is kneaded by a triple roll mill.

(F) Each component is kneaded by an extruder type kneading extruder.

(G) Each component is kneaded by a rotation-revolution mixer.

When using a photopolymerization initiator as a radical polymerization initiator, from the handling and mixing of the aforementioned components to the pre-curing treatment are carried out under the illumination passed through a filter that removes the absorption wavelength with which the photopolymerization initiator is decomposed.

When using a thermal polymerization initiator, it is preferable to control the heat generated by the kneading process, so that the temperature is lower than the decomposition onset temperature of the thermal polymerization initiator to be used.

<Curing and Application>

A cured product of the present invention is formed by curing the ene-thiol based curable composition described above.

When curing the ene-thiol based curable composition of the present invention containing a photopolymerization initiator, a light source to be used may be a light source having a wavelength that matches the absorption wavelength of the initiator, and in general, a high pressure mercury lamp, a medium pressure mercury lamp, a low pressure mercury lamp, an electron beam (EB), an LED light source, and the like can be used.

When curing the ene-thiol based curable composition of the invention containing a thermal polymerization initiator, with regard to the curing temperature, the heating temperature may be set in consideration of the half-life temperature of the thermal polymerization initiator to be used. When carrying out a polymerization reaction, although there are few limitations on the curing atmosphere in the thiol-ene reaction, if necessary, in order to minimize the contact with oxygen, shielding from oxygen by attaching a film or the like that does not inhibit the transmission of light or heat onto the curing surface, or curing under an inert gas atmosphere such as a nitrogen gas, and an argon gas may be conducted.

The ene-thiol based curable composition and its cured product of the present invention can be used for: (a) coating materials and coating agents such as coating agents for plastics, floor coating agents, exterior coating agents, automobile coating agents and primers; (b) adhesives between substrates such as structure adhesives, elastic adhesives, solvent type reactive adhesives, tackifiers, pressure sensitive adhesives, film-sensitive adhesives, gluing agents and adhesive materials for hard substrates and soft substrates; (c) sealing agents, (d) repair injection agents for concrete; (e) matrix resins for laminates such as fiber-reinforced laminates; (f) electronic materials such as casting insulating materials, semiconductor sealing agents, interlayer insulating materials, etching resist materials, plating resists, and solder resists; (g) repairing putty; (i) impact buffering agents such as liquid packing and gaskets; and (j) other impregnation, injection and molding applications, and the like. In particular, it can be suitably used in applications requiring elasticity and optical transparency in order to alleviate the impact.

EXAMPLES

An ene-thiol based curable composition of the present invention will be described below based on a series of Examples and Comparative Examples, although the present invention is not limited to the following examples.

<Analytical Method>

[Number Average Molecular Weight]

The number average molecular weight of each oligomer of Synthesis Examples 1 to 3 was measured under the following conditions.

Type of machine used: GPC system SIC-480II manufactured by Showa Denko K.K., Column: GPC columns K-801, K-802, K-802.5 manufactured by Showa Denko K.K., Detector: RI-201H manufactured by Showa Denko K.K., Eluent: chloroform, Measurement method: 100 μL of a sample dissolved in chloroform was introduced into a column controlled to 40° C. to measure the number average molecular weight in terms of polystyrene.

[Method of Measuring Ene Equivalent (Iodine Value) of Oligomer]

Measurement was made by a method based on JIS standard K0070-6.

Synthesis Example 1

Synthesis Example of Ene Oligomer A 300 g of diallyl terephthalate (manufactured by Tokyo Chemical Industry Co., Ltd.), 43 g of diethylene glycol (manufactured by Wako Pure Chemical Industries, Ltd.), 31 g of propylene glycol (manufactured by Wako Pure Chemical Industries, Ltd.), and 0.3 g of dibutyltin oxide (manufactured by Tokyo Chemical Industry Co., Ltd.) were charged into a three-necked flask and heated in an oil bath adjusted to a temperature of 180° C. to carry out an ester exchange reaction. The pressure was gradually reduced from atmospheric pressure to 1.4 kPa, and the reaction was deemed to be complete at the point where a theoretical amount of allyl alcohol was distilled off. The reaction solution was taken out after cooling to obtain 275 g of an ene oligomer A which was a mixture of ene oligomers represented by the following formula (2-1-1) and ene oligomers represented by the following formula (2-2-1).

[Chemical Formula 22]

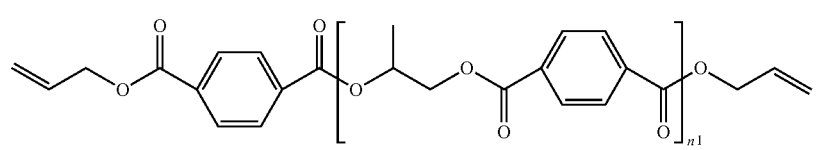

(2-1-1)

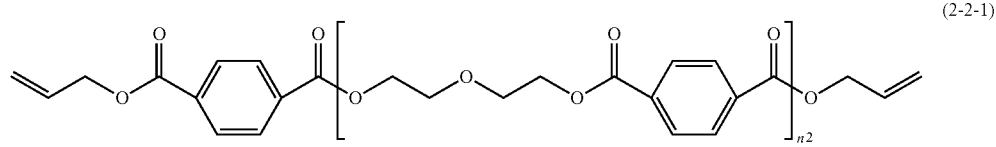

(2-2-1)

Synthesis Example 2

Synthesis Example of Ene Oligomer B 300 g of diallyl 1,4-cyclohexanedicarboxylate (manufactured by Tokyo Chemical Industry Co., Ltd.), 80 g of trimethylolpropane (manufactured by Wako Pure Chemical Industries, Ltd.), and 0.3 g of dibutyltin oxide (manufactured by Tokyo Chemical Industry Co., Ltd.) were charged into a three-necked flask, and 320 g of an ene oligomer B represented by the following formula (3-1-1) was obtained by the same operation as in Synthesis Example 1.

[Chemical Formula 23]

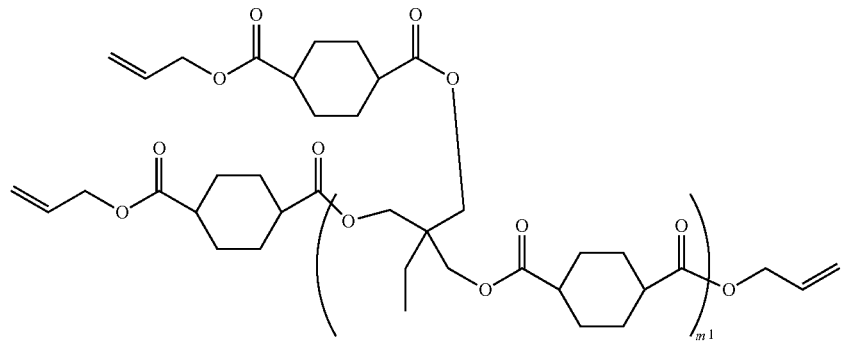

(3-1-1)

Synthesis Example 3,

Synthesis example of ene oligomer C 300 g of diallyl 1,4-cyclohexanedicarboxylate, 55 g of pentaerythritol (manufactured by Tokyo Chemical Industry Co., Ltd.), and 0.3 g of dibutyltin oxide were charged into a three-necked flask, and 285 g of an ene oligomer C represented by the following formula(3-2-1) was obtained by the same operation as in Synthesis Example 1.

[Chemical Formula 24]

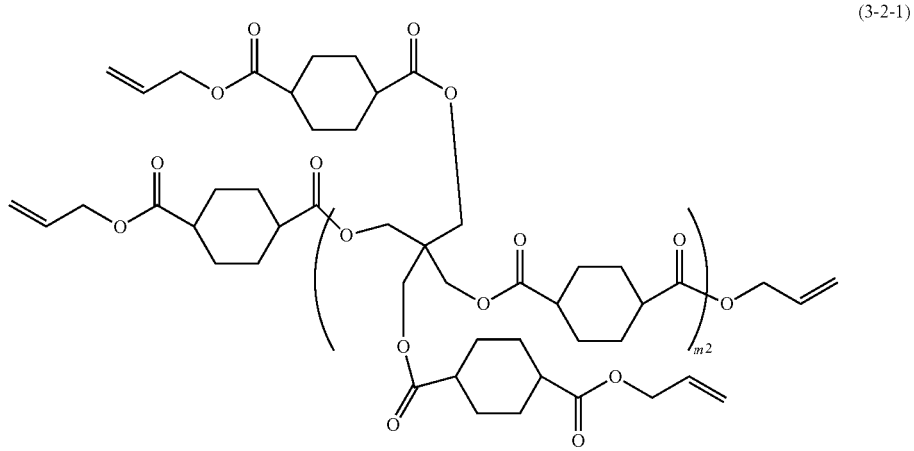

(3-2-1)

Synthesis Example 4

Synthesis Example of Ene Oligomer D 300 g of diallyl 1,4-cyclohexanedicarboxylate, 300 g of di-(hexan-6-ol) carbonate ester, and 0.3 g of dibutyltin oxide were charged into a three-necked flask, and 525 g of an ene oligomer D represented by the following formula (4-1-1) was obtained by the same operation as in Synthesis Example 1.

[Chemical Formula 25]

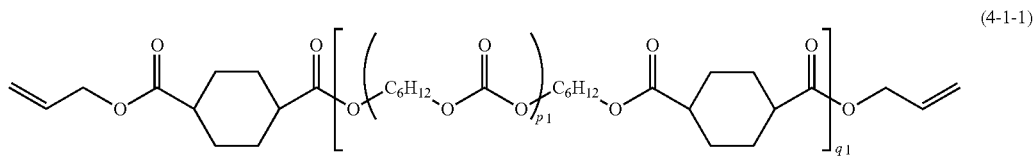

(4-1-1)

The number average molecular weight and ene equivalent of each oligomer obtained in Synthesis Examples 1 to 4 were as shown below in Table 1.

TABLE 1

| Name | | Number average molecular weight (g/mol) * round numbers | Ene equivalent (g/1 ene mol) |
| --- | --- | --- | --- |
| Synthesis Example 1 | Ene oligomer A | 1,000 | 177.6 |
| Synthesis Example 2 | Ene oligomer B | 4,000 | 230.9 |
| Synthesis Example 3 | Ene oligomer C | 12,000 | 196.9 |
| Synthesis Example 4 | Ene oligomer D | 3,500 | 384.6 |

Example 1

43 g of PE1 as the thiol compound (A), 57 g of the ene oligomer A as an ene oligomer (B), and 2 g of IRG184 as a photopolymerization initiator (1-hydroxy-cyclohexyl-phenyl-ketone, manufactured by BASF, trade name "Irgacure (registered trademark) 184") were mixed by a rotation-revolution mixer in such a manner that the molar ratio of the number of moles of mercapto groups to the number of moles of the double bonds of ene compounds was 1.0, to obtain a resin composition. Using an appropriate amount of the ene-thiol curable composition, an adhesion test and a storage stability test were carried out.

Further, the composition was sandwiched between 2 glass plates and pressed and expanded to have a thickness of about 500 μm. At this time, a PET film (COSMOSHINE A4100 manufactured by Toyobo Co., Ltd.) was sandwiched between the glass surfaces in order to improve the detachability of the cured product. The glass plates were cured at an integrated light quantity of 2,000 mJ/cm$^2$ by a UV exposure machine (manufactured by Ushio Inc., model: ML-251D/B) to thereby obtain a cured film. The flexibility test, the solvent resistance test and the tensile test were carried out by using the cured film released from the glass plate.

Examples 2 to 7, Comparative Examples 1 to 4

Various tests were carried out by using the cured film obtained by the same operation as in Example 1, with the exception that the type and amount used of the thiol compound were changed as shown below in Table 2.

TABLE 2

| | | Functional group equivalent | Ex. 1 | Ex. 2 | Ex. 3 | Ex. 4 | Ex. 5 | Ex. 6 | Ex. 7 | Comp. Ex. 1 | Comp. Ex. 2 | Comp. Ex. 3 | Comp. Ex. 4 |
|---|---|---|---|---|---|---|---|---|---|---|---|---|---|
| Thiol compound (A) | PE1 | 134.7 | 43 | 37 | 41 | 26 | | | | 60 | 62 | 52 | |
| | PE0 | *136.2 | | | | | 43 | | | | | | |
| | PE2 | 147.5 | | | | | | 45 | | | | | |
| Other thiol | PEMP | 129.7 | | | | | | | 42 | | | | |
| Ene oligomer (B) | Ene oligomer A | 177.6 | 57 | | | | 57 | 55 | 58 | | | | |
| | Ene oligomer B | 230.9 | | 63 | | | | | | | | | |
| | Ene oligomer C | 196.9 | | | 59 | | | | | | | | |
| | Ene oligomer D | 384.6 | | | | 74 | | | | | | | |
| Other ene compounds | P-30 | 90 | | | | | | | | 40 | | | |
| | TAIC | *83.1 | | | | | | | | | 38 | | |
| | DAP | 125 | | | | | | | | | | 48 | |
| | TMPTA | | | | | | | | | | | | 100 |

Unit of functional group equivalent: (g/1 thiol group mol) or (g/1 ene mol)
For functional group equivalent values, the values that are marked with an asterisk are calculated values while others are measured values.
(obtained by oxidation titration for thiol compound (A), and measurement of iodine value for ene oligomer (B))
In the table, numerical values described in the column for each example represents the mass (g).

PE0: 100% by mass of pentaerythritol tetrakis(3-mercaptobutyrate) represented by the following formula (1-2-1). Molecular weight 544.8 g/mol, tetrafunctional thiol/1 molecule. In other words, as a calculated value, thiol functional group equivalent=136.2 g/1 mercapto group mol.

PE1: A mixture of 85% by mass of pentaerythritol tetrakis(3-mercaptobutyrate) represented by the following formula (1-2-1) and 15% by mass of pentaerythritol tris(3-mercaptobutyrate) represented by the following formula (1-3-1).

PE2: A mixture of 95% by mass of pentaerythritol tris(3-mercaptobutyrate) represented by the following formula (1-3-1) and 5% by mass of pentaerythritol tetrakis(3-mercaptobutyrate) represented by the following formula (1-2-1).

PEMP: pentaerythritol tetrakis(3-mercaptopropionate) represented by the following formula (1-1-1) manufactured by Sigma-Aldrich Co. LLC.

P-30: pentaerythritol triallylether, trade name "Neoallyl (registered trademark) P-30" manufactured by Daiso Chemical Co., Ltd.

TAIC: triallyl isocyanurate manufactured by Nippon Kasei Chemical Co., Ltd.

DAP: diallyl phthalate ester, trade name "Daiso DAP Monomer" manufactured by Daiso Chemical Co., Ltd.

TMPTA: trimethylolpropane triacrylate manufactured by Nippon Kayaku Co., Ltd.

[Chemical Formula 26]

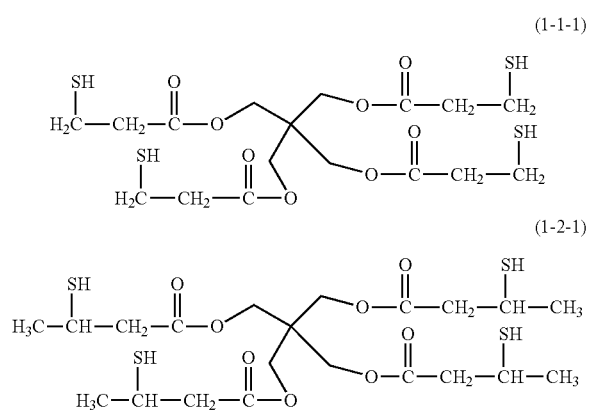

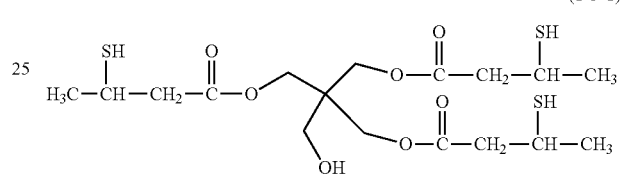

(Flexibility Test)

The cured films produced by the methods described in Examples were bent, and after placing about 1 kg of weight on the bent portion for 15 seconds, the weight was lifted. The state of creases when the loading and unloading of weight were repeated 10 times was observed.
  ○: No change was observed.
  Δ: Fractured by multiple times of bending.
  x: Fractured by a single bending.

The results of evaluation are presented in Table 3 and in Table 5.

(Solvent Resistance Test)

A disc-shaped test piece of 40 mm in diameter was cut out from the cured film produced by the method described in Examples. After weighing the weight of the test piece before the evaluation, the test piece was placed in a glass container containing water, 10% aqueous acetic acid solution, isopropyl alcohol, and methyl ethyl ketone, and submerged in the liquid so as to be completely immersed. After closing the lid, the vessel containing the test piece was stored in a thermostatic chamber set to 23° C. The test piece was taken out from the glass container on day 7, and the weight of the test piece was measured after wiping off the solvent adhered onto the surface. The liquid absorption rate was determined as follows: ((weight after immersion)−(weight before immersion))÷(weight before immersion)=liquid absorption rate (%).

The results are presented in Table 3 and in Table 5.

(Tensile Test)

A No. 2 dumbbell test piece having a size reduced by 40% was cut out from a cured film produced by the method described in Examples by a laser processing machine, and the elastic modulus, the tensile fracture stress and the tensile fracture strain at a tensile speed of 5 mm/min were evaluated using the table-top precision universal tester Autograph AGS-X (Tensilon) manufactured by Shimadzu Corporation.

The tests were carried out by removing the maximum values, the minimum values and the outliers so as to be N=7 in a constant temperature and humidity chamber which was set to a temperature of 23° C. and a humidity of 50%.

The results of evaluation are presented in Table 3 and in Table 5.

(Adhesion Test)

An appropriate amount of the composition made with the number of parts described in Examples was applied on a dolly for adhesion test, and cured in the same manner as in Examples after being adhered onto a glass plate. Thereafter, adhesion of the resin to glass was measured using a pull-off type adhesion test machine manufactured by Elecometer Ltd.

The results of evaluation are presented in Table 3 and in Table 5.

(Storage Stability Test)

In the examples, the resin composition obtained by mixing using a rotation-revolution mixer was stored for 6 days in a thermostatic drier at 60° C. without curing, and whether the gelling of the resin composition occurred was assessed by visual inspection in the following manner. The occurrence of gelling was confirmed when solids were observed in the liquid of the composition.
- ○: No gelling was observed.
- x: Gelling was observed.
- Δ: Apparent thickening was observed.

The results of evaluation are presented in Tables 3 to 5.

TABLE 5

<<Difference due to ratio of tetrafunctional and trifunctional components in secondary thiol>>

| | | Flexibility | Storage stability | Solvent resistance (liquid absorption rate [%]) | | | Adhesion [MPa] |
|---|---|---|---|---|---|---|---|
| | | | | Water | IPA | MEK | |
| Example 1 | PE1 | ○ | ○ | 0.2 | 1.4 | 40 | 1.4 |
| Example 5 | PE0 | ○ | ○ | 0.3 | 0.7 | 40 | 0.9 |
| Example 6 | PE2 | ○ | ○ | 0.8 | 4.5 | 70 | 1.2 |

From Tables 3 to 5, by using the ene oligomer (B) according to the present invention, it was made apparent that a cured product capable of balancing the results of the tensile test and the solvent resistance can be achieved. Furthermore, it was revealed that a composition excellent in storage stability as a composition can be achieved by using the thiol compound (A) according to the present invention.

In addition, although the reason is not clear, it is presumed that by including ene oligomers, the cross-linking density of the polymerization product improves, thereby increasing the bending resistance, the fracture resistance and the elongation due to the bending.

Moreover, it is presumed that the solvent resistance is improved because the network structure of the cured product becomes dense due to the increase of cross-linking density. In particular, the improvement of solvent resistance is remarkable in the case of secondary thiol having an alkyl

TABLE 3

<<Comparison using allyl monomers and ene oligomers>>

| | | Flexibility | Storage stability | Solvent resistance (liquid absorption rate [%]) | | | Tensile test | | | Adhesion [MPa] |
|---|---|---|---|---|---|---|---|---|---|---|
| | | | | Water | 10% aqueous acetic acid solution | IPA | Elastic modulus [MPa] | Tensile fracture stress [MPa] | Tensile fracture strain [MPa] | |
| Example 1 | Ene oligomer A | ○ | ○ | 0.2 | 0.3 | 1.4 | 9.7 | 13.3 | 122 | 1.4 |
| Example 2 | Ene oligomer B | ○ | ○ | 0.2 | 0.2 | 1.5 | 10.1 | 11.6 | 104 | 1.5 |
| Example 3 | Ene oligomer C | ○ | ○ | 0.2 | 0.2 | 1.5 | 10.1 | 11 | 108 | 1.5 |
| Example 4 | Ene oligomer D | ○ | ○ | 0.3 | 0.3 | 1.7 | 11 | 14 | 135 | 1.7 |
| Comparative Example 1 | P-30 | x | x | 1 | 2.6 | 11.1 | 20.5 | 3.7 | 17.9 | 0.6 |
| Comparative Example 2 | TAIC | x | x | 2.1 | 1.3 | 0.3 | 2,700 | 24.9 | 19.7 | 0.3 |
| Comparative Example 3 | DAP | Δ | x | 0.4 | 0.8 | 2.3 | 8.1 | 3.9 | 53.7 | 1.3 |
| Comparative Example 4 | TMPTA | x | x | 1.6 | 1.6 | −0.3 | 1,990 | 22.1 | 1.6 | 0.3 |

TABLE 4

<<Comparison using primary thiol and secondary thiol>>

| | | Storage stability (60° C. × 1 day) |
|---|---|---|
| Example 1 | PE1 | ○ |
| Example 7 | PEMP | Δ | chain in the vicinity of a mercapto group, and it is presumed that improvements in the hydrophobicity derived from the alkyl chain contribute to the improvement of the solvent resistance against a protic solvent.

On the other hand, in the case of acrylate compounds, it is presumed that since not only the Michael addition reaction of thiols with acrylates, but also the homopolymerization of acrylates occurs, to thereby form a hard cured product with a high degree of crosslinking, sufficient levels of flexibility, tensile strength, elongation, and adhesion cannot be achieved.

When a primary thiol is used, due to poor stability of the composition, the available time may be shortened. Since the stability of the composition improves considerably when a secondary thiol is used, storage period of the composition can be increased, which leads to superior practicality. Although the reason for this cannot be specified, the reaction of a mercapto group and a double bond is presumed to be a factor affecting the storage stability of the composition. In the case of secondary thiols represented by 3-mercaptobutanoate, it is presumed that the addition reaction to the double bond is inhibited by an alkyl group in the vicinity of a mercapto group, thereby improving the stability.

INDUSTRIAL APPLICABILITY

The present invention can provide a thiol-ene curable resin composition capable of forming a cured product with excellent flexibility, fracture resistance, and solvent resistance.

The invention claimed is:
1. An ene-thiol based curable composition comprising:
(A) a thiol compound having two or more groups represented by a following general formula (1) in the molecule; and
(B) an ene oligomer having an alicyclic or aromatic ring structure and two or more ethylenically unsaturated groups in the molecule, with a number average molecular weight of 500 to 20,000 in terms of polystyrene:

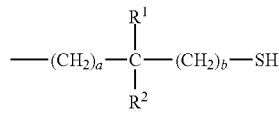

(1)

wherein in the general formula (1), each of $R^1$ and $R^2$ independently represents a hydrogen atom, an alkyl group having 1 to 10 carbon atoms, or an aromatic group having 6 to 10 carbon atoms; a is an integer of 0 to 2; and b is 0 or 1,
wherein said thiol compound (A) is ester compounds of mercapto group-containing carboxylic acids represented by a following general formula (1b) and polyhydric alcohols,

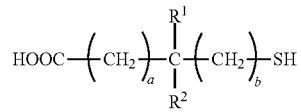

(1b)

wherein in the general formula (1b), $R^1$, $R^2$, a and b are the same as defined in the general formula (1), wherein said ene oligomer (B) is any one or more of oligomers represented by the following general formulae (2) to (4):

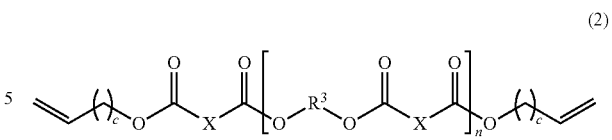

(2)

wherein in the general formula (2), c is 1; $R^3$ is an alkylene group having 1 to 10 carbon atoms in the main chain which may have an alkyl group of 1 to 5 carbon atoms as a substituent and which may have an ether linkage inserted therewithin; X is a phenylene group or a cyclohexylene group which may have an alkyl group of 1 to 4 carbon atoms as a substituent; and n is an integer of 3 to 20,

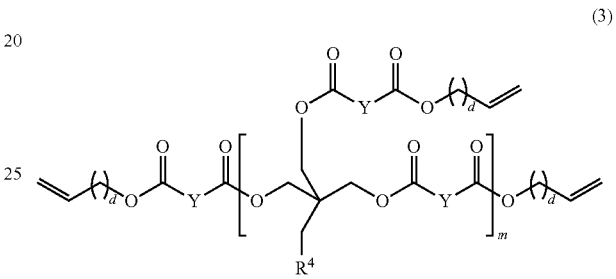

(3)

wherein in the general formula (3), d is the same as c described above; $R^4$ is an alkyl group of 1 to 4 carbon atoms or a group represented by the following formula (3'); Y is the same as X described above; and m is an integer of 3 to 70,

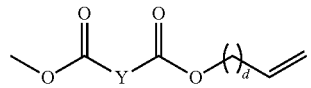

(3')

wherein in the general formula (3'), d and Y are the same as described above in the general formula (3),

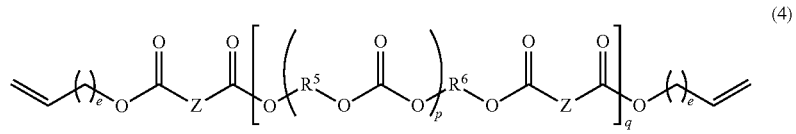

(4)

wherein in the general formula (4), e is the same as c described above; each of $R^5$ and $R^6$ independently represents an alkylene group having 1 to 10 carbon atoms in the main chain which may have an alkyl group of 1 to 5 carbon atoms as a substituent; Z is the same as X described above; p is an integer of 1 to 10; and q is an integer of 5 to 50.

2. The ene-thiol based curable composition according to claim 1, wherein b is 0 in said thiol compound (A).

3. The ene-thiol based curable composition according to claim 1,
wherein said thiol compound (A) is a thiol compound (A1) having two or more groups represented by the general formula (1) in the molecule and having no hydroxyl group in the molecule.

4. The ene-thiol based curable composition according to claim 1,
wherein said thiol compound (A) comprises both of a thiol compound (A1) having two or more groups represented by said general formula (1) in the molecule and having no hydroxyl group in the molecule, and a thiol compound (A2) having two or more groups represented by said general formula (1) in the molecule and having a hydroxyl group in the molecule.

5. The ene-thiol based curable composition according to claim 4, wherein said thiol compound (A2) accounts for from 0.1 to 30% by mass of said thiol compound (A).

6. The ene-thiol based curable composition according to claim 3, wherein said thiol compound (A1) is pentaerythritol tetrakis(3-mercaptobutyrate).

7. The ene-thiol based curable composition according to claim 4, wherein said thiol compound (A2) is pentaerythritol tris(3-mercaptobutyrate).

8. The ene-thiol based curable composition according to claim 1,
wherein said thiol compound (A) and said ene oligomer (B) are included in such a manner that the ethylenically unsaturated group in said ene oligomer (B) is contained at a ratio of 0.5 to 10 mol relative to 1 mol of a mercapto group in said thiol compound (A).

9. The ene-thiol based curable composition according to claim 1, further comprising a photopolymerization initiator and/or a thermal polymerization initiator.

10. A cured product which is formed by curing the ene-thiol based curable composition according to claim 1.

* * * * *